United States Patent
Burchill et al.

(10) Patent No.: US 12,138,986 B2
(45) Date of Patent: Nov. 12, 2024

(54) TRANSPORT REFRIGERATION SYSTEM

(71) Applicant: Carrier Corporation, Palm Beach Gardens, FL (US)

(72) Inventors: Jeffrey J. Burchill, Baldwinsville, NY (US); Mary D. Saroka, Syracuse, NY (US); Yu H. Chen, Manlius, NY (US); Ivan Rydkin, Rochester, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 18/068,896

(22) Filed: Dec. 20, 2022

(65) Prior Publication Data

US 2023/0117165 A1    Apr. 20, 2023

Related U.S. Application Data

(62) Division of application No. 16/620,357, filed as application No. PCT/US2018/035994 on Jun. 5, 2018, now Pat. No. 11,565,568.

(Continued)

(51) Int. Cl.
    *B60H 1/00*      (2006.01)
    *B60H 1/32*      (2006.01)
    *F25D 11/00*     (2006.01)

(52) U.S. Cl.
    CPC ..... *B60H 1/00278* (2013.01); *B60H 1/00014* (2013.01); *B60H 1/00378* (2013.01);
(Continued)

(58) Field of Classification Search
    CPC ............ B60H 1/00278; B60H 1/00014; B60H 1/00378; B60H 1/00428; B60H 1/00885;
(Continued)

(56) References Cited

U.S. PATENT DOCUMENTS

| | | | | | |
|---|---|---|---|---|---|
| 1,476,546 A | * | 12/1923 | Replogle | ................. | F25D 11/04 62/433 |
| 1,541,797 A | * | 6/1925 | Dennison | ................. | F25D 11/04 62/433 |

(Continued)

FOREIGN PATENT DOCUMENTS

| | | | | |
|---|---|---|---|---|
| CA | 2898312 A1 | * | 10/2014 | .......... H01M 10/613 |
| CN | 101801168 A | * | 8/2010 | |

(Continued)

OTHER PUBLICATIONS

Adair et al.; "Thermal Management of Lithium-ion Battery Packs"; Comsol Conference; 2014; 15 Pages.

(Continued)

*Primary Examiner* — Ljiljana V. Ciric
(74) *Attorney, Agent, or Firm* — CANTOR COLBURN LLP

(57) ABSTRACT

An energy storage device for providing electrical energy to a refrigeration unit arranged to cool a container, the refrigeration unit including a condenser and an evaporator configured to cool air entering the container, the energy storage device including a casing; a battery disposed in the casing; and an evaporator subsystem including: a supply refrigerant tube configured to supply refrigerant from downstream of the condenser of the refrigeration unit; an expansion device arranged to receive condensed refrigerant from the supply refrigerant tube; a heat exchanger arranged to receive and evaporate refrigerant from the expansion device; a return refrigerant tube configured to return refrigerant from the heat exchanger to downstream of the evaporator of the refrigeration unit; wherein the evaporator subsystem includes an evaporator fan assembly constructed and arranged to flow air through the heat exchanger and into the casing about the battery.

3 Claims, 3 Drawing Sheets

Related U.S. Application Data

(60) Provisional application No. 62/515,581, filed on Jun. 6, 2017.

(52) U.S. Cl.
CPC ..... *B60H 1/00428* (2013.01); *B60H 1/00885* (2013.01); *B60H 1/3222* (2013.01); *B60H 1/3227* (2013.01); *B60H 1/3232* (2013.01); *F25D 11/003* (2013.01); *B60H 2001/00307* (2013.01); *B60H 2001/3292* (2013.01)

(58) Field of Classification Search
CPC .. B60H 1/3222; B60H 1/3227; B60H 1/3232; B60H 2001/00307; B60H 2001/3292; F25D 11/003; Y02E 60/10
See application file for complete search history.

(56) References Cited

U.S. PATENT DOCUMENTS

| | | | |
|---|---|---|---|
| 1,603,549 A * | 10/1926 | Carl | F25D 11/04 62/518 |
| 1,789,532 A * | 1/1931 | Morrell | F25D 11/04 62/437 |
| 2,231,012 A * | 2/1941 | Kleist | F25D 11/04 62/526 |
| 2,356,778 A * | 8/1944 | Morrison | F25D 31/006 312/236 |
| 2,408,805 A * | 10/1946 | Millott | F25D 11/04 62/451 |
| 2,959,939 A * | 11/1960 | Arzberger | F25D 11/00 62/283 |
| 3,153,919 A * | 10/1964 | Jernigan | F25D 11/04 62/453 |
| 3,670,808 A * | 6/1972 | Wait, Jr. | B60H 1/00378 62/428 |
| 3,902,332 A * | 9/1975 | Torcomian | F25D 23/061 62/453 |
| 4,015,182 A | 3/1977 | Erdman | |
| 4,280,330 A | 7/1981 | Harris et al. | |
| 4,344,299 A * | 8/1982 | Latzer | F25D 11/003 62/448 |
| 4,720,980 A | 1/1988 | Howland | |
| 5,097,241 A * | 3/1992 | Smith | H01F 27/2876 336/60 |
| 5,140,826 A | 8/1992 | Hanson et al. | |
| 5,187,945 A * | 2/1993 | Dixon | B60H 1/3232 62/239 |
| 5,272,887 A * | 12/1993 | Zendzian, Sr. | F25D 3/005 62/515 |
| 5,333,678 A | 8/1994 | Mellum et al. | |
| 5,438,842 A | 8/1995 | Watkins et al. | |
| 5,456,088 A | 10/1995 | Hanson et al. | |
| 5,490,572 A | 2/1996 | Tajiri et al. | |
| 5,562,538 A | 10/1996 | Suyama | |
| 5,682,757 A | 11/1997 | Peterson | |
| 5,756,227 A * | 5/1998 | Suzuki | H01M 10/625 429/62 |
| 5,901,572 A | 5/1999 | Peiffer et al. | |
| 5,937,664 A | 8/1999 | Matsuno et al. | |
| 5,964,089 A | 10/1999 | Murphy et al. | |
| 6,106,972 A * | 8/2000 | Kokubo | B60L 58/26 429/120 |
| 6,230,507 B1 | 5/2001 | Ban et al. | |
| 6,512,347 B1 * | 1/2003 | Hellmann | H01M 10/625 429/120 |
| 6,834,715 B2 * | 12/2004 | Garcia | H01M 10/6569 165/47 |
| 6,889,762 B2 | 5/2005 | Zeigler et al. | |
| 6,931,884 B2 | 8/2005 | Kolda et al. | |
| 7,013,659 B2 | 3/2006 | Yoshida et al. | |
| 7,096,925 B2 | 8/2006 | Bracciano | |
| 7,150,159 B1 | 12/2006 | Brummett et al. | |
| 7,237,397 B2 | 7/2007 | Allen | |
| 7,316,119 B2 | 1/2008 | Allen | |
| 7,454,922 B2 | 11/2008 | Zeigler et al. | |
| 7,658,083 B2 | 2/2010 | Zhu et al. | |
| 7,765,831 B2 | 8/2010 | Rodriguez et al. | |
| 7,841,431 B2 | 11/2010 | Zhou | |
| 8,082,743 B2 | 12/2011 | Hermann et al. | |
| 8,250,881 B1 * | 8/2012 | Reihl | F25D 11/006 62/453 |
| 8,329,325 B2 * | 12/2012 | Brodie | H01M 10/6568 429/61 |
| 8,336,319 B2 | 12/2012 | Johnston et al. | |
| 8,347,645 B1 | 1/2013 | Miller | |
| 8,632,923 B2 * | 1/2014 | Sohn | H01M 10/63 165/41 |
| 8,647,763 B2 * | 2/2014 | Tennessen | H01M 10/6567 429/62 |
| 8,984,881 B1 | 3/2015 | Stanton | |
| 9,434,237 B2 | 9/2016 | Olaleye | |
| 9,580,003 B2 | 2/2017 | Olaleye | |
| 9,583,800 B2 | 2/2017 | Hwang et al. | |
| 10,006,684 B2 | 6/2018 | Connell et al. | |
| 10,173,495 B2 | 1/2019 | Brown | |
| 10,573,943 B2 * | 2/2020 | Bass | H01M 10/6569 |
| 10,589,593 B2 | 3/2020 | Westendarp et al. | |
| 10,619,916 B2 * | 4/2020 | Chou | F25D 11/02 |
| 11,118,833 B2 * | 9/2021 | Poolman | B60H 1/3232 |
| 11,289,755 B2 * | 3/2022 | Bass | H01M 10/613 |
| 11,565,568 B2 * | 1/2023 | Burchill | F25D 11/003 |
| 11,760,168 B2 * | 9/2023 | Van Wijk | H02J 7/1415 62/239 |
| 2001/0010261 A1 | 8/2001 | Domura et al. | |
| 2002/0078700 A1 | 6/2002 | Keim | |
| 2002/0084769 A1 | 7/2002 | Iritani | |
| 2002/0112489 A1 | 8/2002 | Egawa et al. | |
| 2002/0157221 A1 | 10/2002 | Wanami et al. | |
| 2004/0060312 A1 | 4/2004 | Horn et al. | |
| 2004/0168449 A1 | 9/2004 | Homan et al. | |
| 2005/0109499 A1 | 5/2005 | Wanami et al. | |
| 2005/0257545 A1 | 11/2005 | Ziehr et al. | |
| 2005/0257926 A1 | 11/2005 | Turner et al. | |
| 2006/0023480 A1 | 2/2006 | Plummer | |
| 2006/0207274 A1 | 9/2006 | Harris | |
| 2007/0000265 A1 | 1/2007 | McEnaney et al. | |
| 2007/0000266 A1 | 1/2007 | McEnaney et al. | |
| 2007/0131408 A1 | 6/2007 | Zeigler et al. | |
| 2007/0193291 A1 | 8/2007 | Reddin et al. | |
| 2007/0251685 A1 | 11/2007 | Megas | |
| 2008/0014852 A1 | 1/2008 | Mielke | |
| 2008/0092559 A1 | 4/2008 | Williams et al. | |
| 2008/0196877 A1 * | 8/2008 | Zeigler | B60H 1/00907 165/202 |
| 2009/0071178 A1 | 3/2009 | Major et al. | |
| 2009/0075135 A1 | 3/2009 | Nonobe | |
| 2009/0107743 A1 | 4/2009 | Alston et al. | |
| 2009/0229288 A1 | 9/2009 | Alston | |
| 2010/0089563 A1 | 4/2010 | Sundhar et al. | |
| 2011/0016899 A1 | 1/2011 | Ogura | |
| 2011/0212356 A1 | 9/2011 | Tennessen et al. | |
| 2012/0153718 A1 | 6/2012 | Rawlinson et al. | |
| 2012/0210733 A1 | 8/2012 | Kolavennu et al. | |
| 2012/0222438 A1 | 9/2012 | Osaka et al. | |
| 2012/0247716 A1 | 10/2012 | Galtz et al. | |
| 2012/0279249 A1 * | 11/2012 | Reihl | F25D 11/006 62/201 |
| 2012/0297809 A1 | 11/2012 | Carpenter | |
| 2013/0298583 A1 | 11/2013 | O'Donnell et al. | |
| 2014/0026599 A1 | 1/2014 | Rusignuolo et al. | |
| 2014/0060097 A1 | 3/2014 | Perreault | |
| 2014/0137590 A1 | 5/2014 | Chopko et al. | |
| 2014/0216098 A1 | 8/2014 | Heinrich et al. | |
| 2014/0356666 A1 | 12/2014 | Murata et al. | |
| 2014/0360214 A1 | 12/2014 | Tansley | |
| 2014/0374081 A1 | 12/2014 | Kakehashi et al. | |
| 2015/0231948 A1 | 8/2015 | Kennedy | |
| 2015/0233617 A1 * | 8/2015 | Chou | F25B 49/02 62/190 |
| 2015/0295285 A1 | 10/2015 | Takeuchi et al. | |

(56) References Cited

U.S. PATENT DOCUMENTS

| | | |
|---|---|---|
| 2015/0380784 A1 | 12/2015 | Bass et al. |
| 2016/0029515 A1 | 1/2016 | Tansley |
| 2016/0201931 A1* | 7/2016 | Ma .................... F28D 15/02 |
| | | 62/434 |
| 2016/0272048 A1 | 9/2016 | Casasanta et al. |
| 2016/0297280 A1 | 10/2016 | Rederer et al. |
| 2018/0029436 A1 | 2/2018 | Zaeri et al. |
| 2018/0106509 A1* | 4/2018 | Hollingsworth ...... F25D 11/003 |
| 2018/0111441 A1 | 4/2018 | Menard et al. |
| 2018/0356870 A1 | 12/2018 | Rusignuolo et al. |
| 2019/0105969 A1* | 4/2019 | Chopko ............... B60H 1/3232 |
| 2019/0120530 A1* | 4/2019 | Chopko ................. F25B 31/02 |
| 2019/0128571 A1 | 5/2019 | Poolman |
| 2019/0288359 A1* | 9/2019 | Bass .................... H01M 10/613 |
| 2019/0323766 A1 | 10/2019 | Poolman et al. |
| 2019/0331408 A1* | 10/2019 | Poolman ............ B60H 1/00014 |
| 2020/0139790 A1* | 5/2020 | Burchill ............... B60H 1/3232 |
| 2020/0232685 A1 | 7/2020 | Swab |
| 2020/0309440 A1 | 10/2020 | Poolman et al. |
| 2021/0098838 A1* | 4/2021 | Droulez ............. H01M 10/6554 |
| 2021/0249182 A1* | 8/2021 | Wijk ...................... H01F 27/10 |
| 2021/0268926 A1* | 9/2021 | Liao ......................... B60L 1/00 |
| 2021/0313639 A1* | 10/2021 | Bass .................... H01M 10/6569 |
| 2021/0313640 A1* | 10/2021 | Bass .................... H01M 10/625 |
| 2022/0049885 A1* | 2/2022 | Twohy .................. F25D 11/003 |
| 2022/0153086 A1 | 5/2022 | Zaeri et al. |
| 2022/0307750 A1* | 9/2022 | She ....................... B60H 1/3232 |
| 2023/0061277 A1* | 3/2023 | Owens .................. F25D 11/003 |
| 2023/0117165 A1* | 4/2023 | Burchill ............. B60H 1/00885 |
| | | 62/239 |
| 2023/0278390 A1* | 9/2023 | Oggianu ............ B60H 1/00364 |
| | | 62/132 |
| 2024/0010116 A1* | 1/2024 | van Hassel ........ B60H 1/00014 |
| 2024/0011688 A1* | 1/2024 | Barg ....................... F25D 11/00 |

FOREIGN PATENT DOCUMENTS

| | | | | |
|---|---|---|---|---|
| CN | 104752788 A | | 7/2015 | |
| CN | 104969410 A | * | 10/2015 | .......... H01M 10/613 |
| CN | 207894114 U | * | 9/2018 | |
| DE | 102008042587 A1 | | 4/2010 | |
| DE | 102018118524 A1 | * | 2/2019 | ......... B60H 1/00342 |
| EP | 3125355 A1 | | 2/2017 | |
| EP | 3932707 A1 | * | 1/2022 | ......... B60H 1/00014 |
| FR | 2712672 A1 | * | 5/1995 | ......... B60H 1/00014 |
| FR | 2968839 A1 | * | 6/2012 | ......... H01M 10/4207 |
| GB | 241325 A | * | 10/1925 | |
| GB | 905977 A | * | 9/1962 | |
| GB | 1032702 A | * | 6/1966 | |
| GB | 2313436 A | * | 11/1997 | .............. F25B 27/00 |
| GB | 2523264 A | | 8/2015 | |
| JP | 2019035572 A | * | 3/2019 | .............. F28D 15/02 |
| KR | 20150129667 A | * | 11/2015 | |
| NL | 2011076 C2 | | 1/2015 | |
| WO | WO-2006103084 A1 | * | 10/2006 | .............. A01K 41/00 |
| WO | 2012021104 A1 | | 2/2012 | |
| WO | WO-2014158938 A1 | * | 10/2014 | .......... H01M 10/613 |
| WO | 2016040435 A1 | | 3/2016 | |
| WO | WO-2016179215 A1 | * | 11/2016 | ............ F25B 39/028 |
| WO | WO-2017027932 A1 | * | 2/2017 | ......... B60H 1/00357 |
| WO | WO-2017095843 A1 | * | 6/2017 | ......... B60H 1/00364 |
| WO | WO-2017176729 A1 | * | 10/2017 | .............. F25B 13/00 |
| WO | WO-2017218912 A1 | * | 12/2017 | ......... B60H 1/00014 |
| WO | WO-2018226649 A1 | * | 12/2018 | ......... B60H 1/00014 |
| WO | WO-2021158787 A1 | * | 8/2021 | .............. A47J 39/00 |

OTHER PUBLICATIONS

International Search Report Issued in International Application No. PCT/US2018/035994 dated Sep. 20, 2018; 6 Pages.

Pesaran et al.; "Addressing the Impact of Temperature Extremes on Large Format Li-Ion Batteries for Vehicle Applications"; 30th International Battery Seminar; Mar. 11-14, 2013; 30 Pages.

Written Opinion Issued in International Application No. PCT/US2018/035994 dated Sep. 20, 2018; 8 Pages.

* cited by examiner

TRANSPORT REFRIGERATION SYSTEM

CROSS-REFERENCE TO RELATED APPLICATIONS

This is a divisional of U.S. application Ser. No. 16/620,357 filed Dec. 6, 2019, which is a National Stage Application of PCT/US2018/035994 filed Jun. 5, 2018, which claims priority to U.S. Provisional Application No. 62/515,581 filed Jun. 6, 2017, all of which are incorporated herein by reference in their entirety.

BACKGROUND

The present disclosure relates to a transport refrigeration system and, more particularly, to an energy storage device of the transport refrigeration system.

Traditional refrigerated cargo trucks or refrigerated tractor trailers, such as those utilized to transport cargo via sea, rail, or road, is a truck, trailer or cargo container, generally defining a cargo compartment, and modified to include a refrigeration system located at one end of the truck, trailer, or cargo container. Refrigeration systems typically include a compressor, a condenser, an expansion valve, and an evaporator serially connected by refrigerant lines in a closed refrigerant circuit in accord with known refrigerant vapor compression cycles. A power unit, such as a combustion engine, drives the compressor of the refrigeration unit, and may be diesel powered, natural gas powered, or other type of engine. In many tractor trailer transport refrigeration systems, the compressor is driven by the engine shaft either through a belt drive or by a mechanical shaft-to-shaft link. In other systems, the engine of the refrigeration unit drives a generator that generates electrical power, which in-turn drives the compressor.

With current environmental trends, improvements in transport refrigeration units are desirable particularly toward aspects of environmental impact. With environmentally friendly refrigeration units, improvements in the use and reliability of energy storage units is also desirable.

BRIEF DESCRIPTION

A transport refrigeration system according to one, non-limiting, embodiment of the present disclosure includes a transport refrigeration unit constructed and arranged to cool a container; an energy storage device constructed and arranged to provide energy for operating the transport refrigeration unit; a supply refrigerant tube for flowing a refrigerant from the transport refrigeration unit to the energy storage device; a return refrigerant tube for flowing the refrigerant from the energy storage device to the transport refrigeration unit; and at least one electrical pathway operatively coupled between the transport refrigeration unit and the energy storage device for supplying at least electrical energy to the transport refrigeration unit.

Additionally to the foregoing embodiment, the energy storage device is remotely located from the transport refrigeration unit.

In the alternative or additionally thereto, in the foregoing embodiment, wherein the energy storage device is remotely located from the transport refrigeration unit.

In the alternative or additionally thereto, in the foregoing embodiment, the container is a trailer, the transport refrigeration unit is mounted to a front wall of the trailer, and the energy storage device is mounted beneath a bottom wall of the trailer.

In the alternative or additionally thereto, in the foregoing embodiment, the energy storage device includes an energy storage unit and an evaporator subsystem in communication with the supply and return refrigerant tubes for cooling the energy storage unit.

In the alternative or additionally thereto, in the foregoing embodiment, the energy storage device includes an evaporator heat exchanger constructed and arranged to receive the refrigerant from the supply refrigerant tube and expel the refrigerant into the return refrigerant line.

In the alternative or additionally thereto, in the foregoing embodiment, the energy storage device includes an evaporator fan assembly constructed and arranged to blow air through the evaporator heat exchanger.

In the alternative or additionally thereto, in the foregoing embodiment, the energy storage device includes a casing that encloses the energy storage unit, and the evaporator heat exchanger is a tube in contact with and extending about the casing for conductive heat transfer.

In the alternative or additionally thereto, in the foregoing embodiment, the transport refrigeration unit includes a compressor constructed and arranged to compress the refrigerant, a compressor motor configured to drive the compressor, a condenser heat exchanger operatively couple to the compressor, a condenser fan configured to provide air flow over the condenser heat exchanger, a condenser fan motor for driving the condenser fan, an evaporator heat exchanger operatively coupled to the compressor, an evaporator fan configured to provide air flow over the evaporator heat exchanger, and an evaporator fan motor for driving the evaporator fan.

In the alternative or additionally thereto, in the foregoing embodiment, the supply refrigerant tube communicates with the transport refrigeration unit between the condenser heat exchanger and the evaporator heat exchanger.

In the alternative or additionally thereto, in the foregoing embodiment, the transport refrigeration system includes a control valve adapted to control the flow of refrigerant and disposed between a receiver of the transport refrigeration unit and the condenser heat exchanger, wherein the control valve communicates with the supply refrigerant tube.

In the alternative or additionally thereto, in the foregoing embodiment, the return refrigerant tube communicates with the transport refrigeration unit between the evaporator heat exchanger and the compressor.

In the alternative or additionally thereto, in the foregoing embodiment, the energy storage device is constructed and arranged to provide electrical energy to at least one of the compressor motor, the condenser fan motor, and the evaporator fan motor.

In the alternative or additionally thereto, in the foregoing embodiment, the energy storage unit is at least one battery.

A remote energy storage device for providing electrical energy to a refrigeration unit, the remote energy storage device according to another, non-limiting, embodiment includes a casing; a battery disposed in the casing; and an evaporator subsystem including a heat exchanger constructed and arranged to receive condensed refrigerant from the refrigeration unit to cool the battery.

Additionally to the foregoing embodiment, the remote energy storage device includes a housing adapted to enclose the casing and the evaporator subsystem, wherein the housing is thermally insulated.

In the alternative or additionally thereto, in the foregoing embodiment, the evaporator subsystem includes an evaporator fan assembly constructed and arranged to flow air through the heat exchanger and about the battery.

In the alternative or additionally thereto, in the foregoing embodiment, the heat exchanger is a tube wrapped about, and in direct contact with, the casing for conductive heat transfer.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
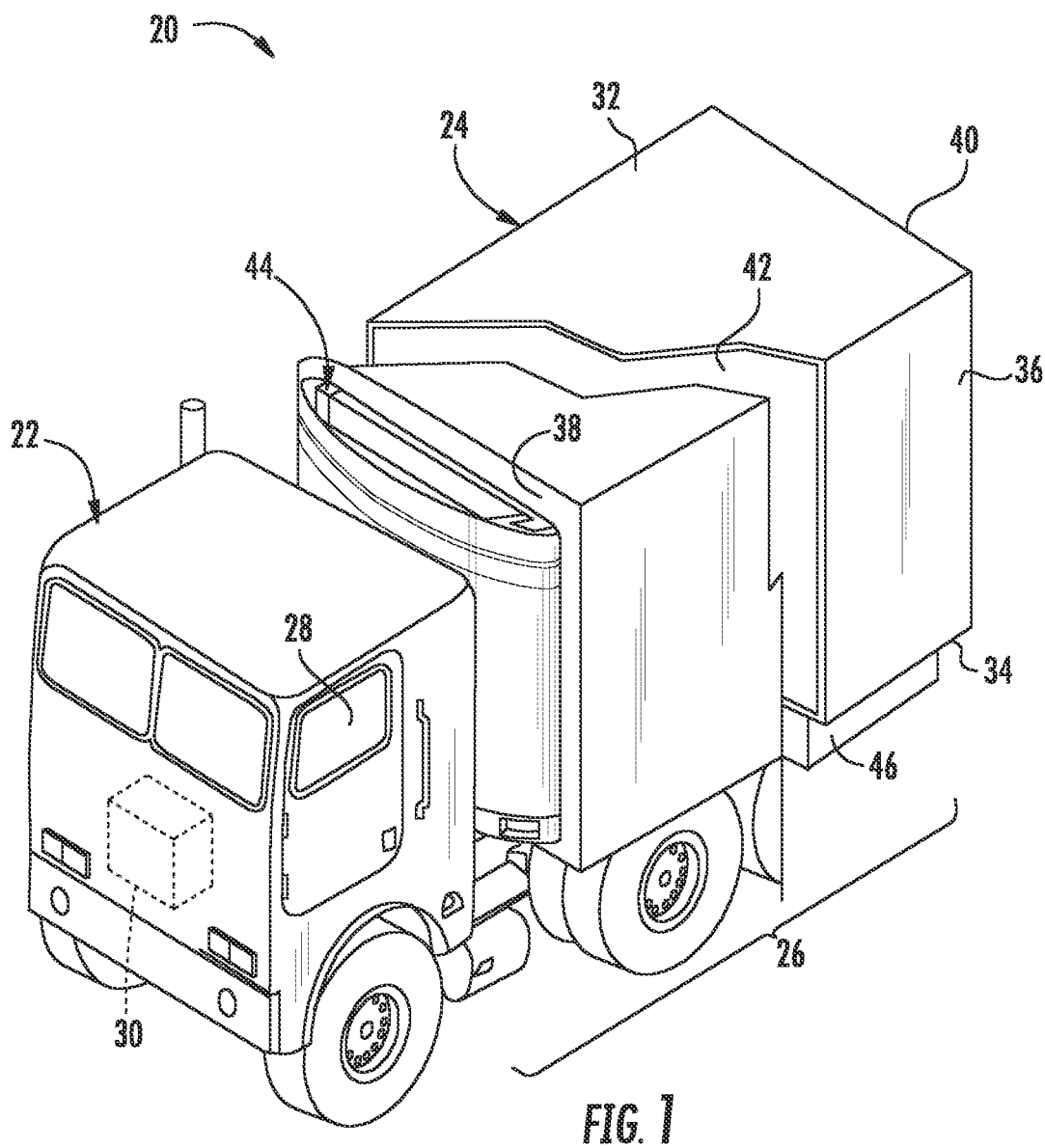
FIG. 1 is a perspective view of a tractor trailer system having a transport refrigeration system as one, non-limiting, embodiment of the present disclosure.

Referring to FIG. 1, a tractor trailer system 20 of the present disclosure is illustrated. The tractor trailer system 20 may include a tractor or truck 22, a trailer 24 and a transport refrigeration system 26. The tractor 22 may include an operator's compartment or cab 28 and a combustion engine 30 is part of the powertrain or drive system of the tractor 22. The trailer 24 may be coupled to the tractor 22 and is thus pulled or propelled to desired destinations. The trailer may include a top wall 32, a bottom wall 34 opposed to and space from the top wall 32, two side walls 36 spaced from and opposed to one-another, and opposing front and rear walls 38, 40 with the front wall 38 being closest to the tractor 22. The trailer 24 may further include doors (not shown) at the rear wall 40, or any other wall. The walls 32, 34, 36, 38, 40 together define the boundaries of a cargo compartment 42. It is further contemplated and understood that the cargo compartment 42 may also be divided into two or more smaller compartments for different cargo temperature requirements.

Figure 2:
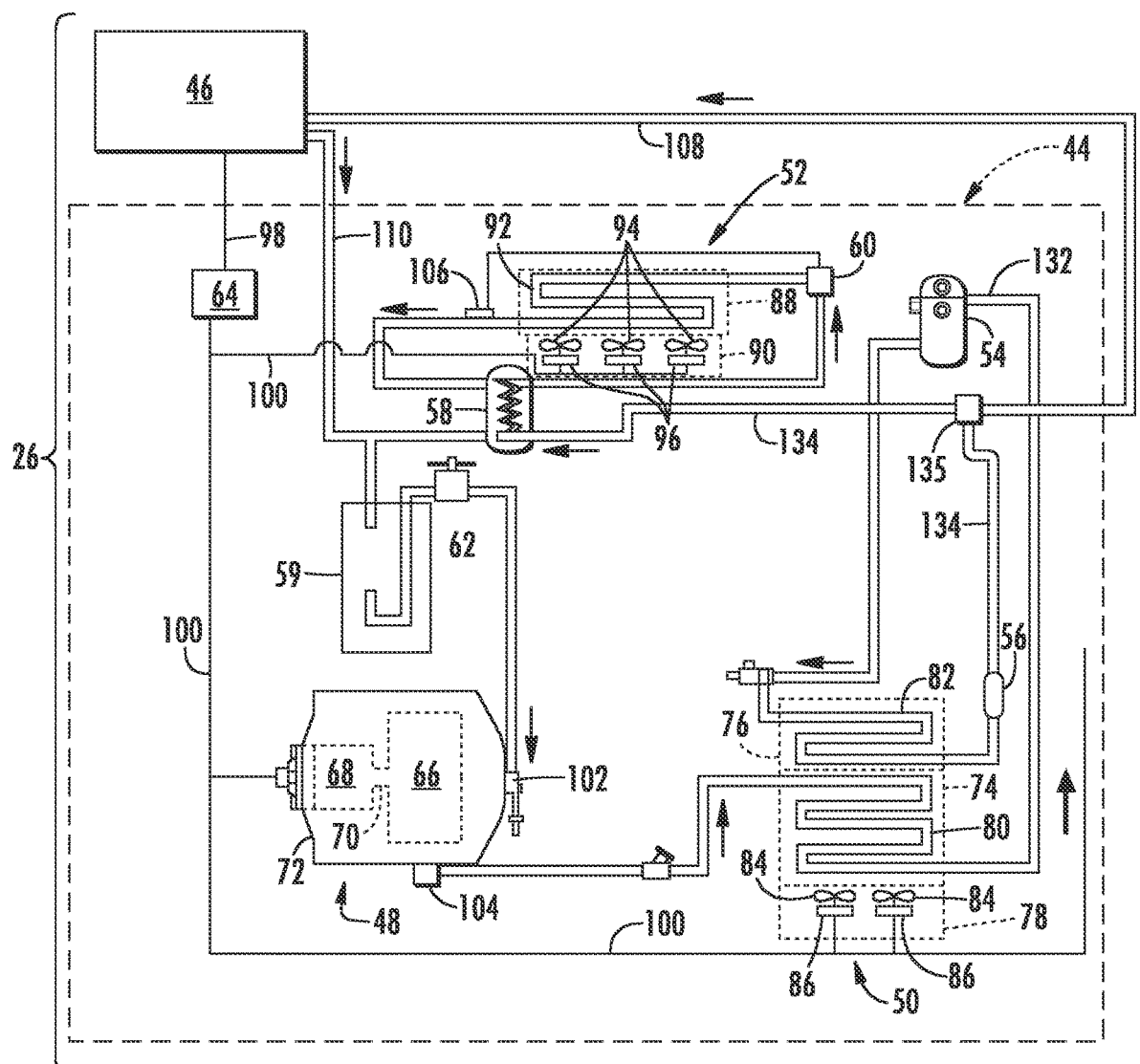
FIG. 2 is a schematic of the transport refrigeration system.

Referring to FIGS. 1 and 2, the trailer 24 is generally constructed to store a cargo (not shown) in the compartment 42. The transport refrigeration system 26 may be generally integrated into the trailer 24, and may include a transport refrigeration unit (TRU) 44 and an energy storage device (ESD) 46. The TRU 44 may be mounted to the front wall 38, and the ESD 46 may generally be mounted remotely. In one example, the ESD 46 may be secured to, and mounted beneath, the bottom wall 34.

The cargo is maintained at a desired temperature by cooling of the compartment 42 via the TRU 44 that circulates airflow into and through the cargo compartment 42 of the trailer 24. It is further contemplated and understood that the transport refrigeration system 26 may be applied to any transport container, and not necessarily those used in tractor trailer systems. Furthermore, the transport container may be a part of the trailer 24 and constructed to be removed from a framework and wheels (not shown) of the trailer 24 for alternative shipping means (e.g., marine, rail, flight, and others).

The components of the TRU 44 may include a compressor assembly 48, a condenser assembly 50, an evaporator assembly 52, a receiver 54, a filter dryer 56, a refrigerant-to-refrigerant heat exchanger 58, an accumulator 59, a thermostatic expansion valve 60, a suction modulation valve 62, and a controller 64. The controller 64 may be locally located with the TRU 44, and may include a computer-based processor (e.g., microprocessor) and an electronic storage medium that may be computer readable and writeable. The compressor assembly 48 may include a compressor 66 and an electric compressor motor 68 for driving the compressor. The compressor 66 may also be driven by alternative means.

The compressor 66 and the compressor motor 68 may be linked via an interconnecting drive shaft 70. The compressor 66, the compressor motor 68 and the drive shaft 70 may be sealed within a common housing 72. In some embodiments, the compressor motor 68 may be positioned outside of the compressor housing 72, with the interconnecting drive shaft 70 passing through a shaft seal (not shown) supported by the compressor housing 72. The compressor 66 may be a single compressor. The single compressor may be a two-stage compressor, a scroll-type compressor or other type of compressor adapted to compress, for example, natural refrigerants. The natural refrigerant may be $CO_2$, propane, ammonia, or any other natural refrigerant that may include a global-warming potential (GWP) of about one (1).

The condenser assembly 50 may include a condenser heat exchanger 74, a subcooler heat exchanger 76, and a condenser fan assembly 78 for flowing air through the heat exchangers 74, 76. The heat exchangers 74, 76 may include respective tubes 80, 82. The fan assembly 78 may include at least one fan 84 and at least one electric fan motor 86 for driving the at least one fan 84 (i.e., two illustrated) that induces the flow of air about the tubes 80, 82 of the respective heat exchangers 74, 76. It is contemplated that alternative means, other than the condenser fan assembly 78, may be applied to induce the flow of air through the condenser heat exchangers 74, 76. It is further contemplated that alternative means, other than the use of the electric fan motor 86, may be applied to drive the condenser fan 84.

The evaporator assembly 52 may include an evaporator heat exchanger 88 and an evaporator fan assembly 90 for flowing air through the heat exchanger 88. The heat exchanger 88 may include tube(s) 92. The fan assembly 90 may include at least one fan 94 and at least one electric fan motor 96 for driving the at least one fan 94 (i.e., three illustrated) that supplies a flow of air about the tubes 92 of the heat exchanger 88. It is contemplated that alternative means, other than the evaporator fan assembly 90, may be applied to induce the flow of air through the evaporator heat exchanger 88. It is further contemplated that alternative means, other than the use of the electric fan motor 96, may be applied to drive the evaporator fan 94.

The transport refrigeration system 26 may further include an electrical pathway or bus 98 that may extend between the ESD 46 and the controller 64. The TRU 44 may further include an electrical pathway or bus 100 that may extend between the controller 64 and the various electrical loads including the compressor motor 68, the condenser fan motor(s) 86, the evaporator fan motors 96, and other loads. Although not illustrated, the pathways 98, 100 may include both control pathways that may be wireless or hardwired, and power supply wiring. In another embodiment, an energy supply pathway may be direct wired from the ESD 46 to the electric motors 68, 86, 96.

Operation of the TRU 44 may be best understood by starting at the compressor 66 of the compressor assembly 48, where the suction gas (e.g., natural refrigerant) enters the compressor 66 at a suction port 102 and is compressed to a higher temperature and pressure. The refrigerant gas is emitted from the compressor 66 at an outlet port 104, and may then flow into the tube(s) 80 of the condenser heat exchanger 74.

Air flowing across a plurality of condenser coil fins (not shown) and the tubes 80, cools the gas to a saturation temperature. The air flow across the condenser heat exchanger 74 is facilitated by the condenser fan assembly 78. By removing latent heat, the gas within the tubes 80 condenses to a high temperature liquid at a high pressure, and flows to the receiver 54 that provides storage for excess liquid refrigerant during low temperature operation. From the receiver 54, the liquid refrigerant may pass through the subcooler heat exchanger 76 of the condenser assembly 50, through the filter-dryer 56 that keeps the refrigerant clean and dry, then to the refrigerant-to-refrigerant heat exchanger 58 that increases the refrigerant subcooling, and finally to the thermostatic expansion valve 60.

As the liquid refrigerant passes through the orifices of the expansion valve 60, some of the liquid vaporizes into a gas (i.e., flash gas). Return air from the refrigerated space (i.e., cargo compartment 42) flows over the heat transfer surfaces of the tubes 92 and fins (not shown) of the evaporator heat exchanger 88. As the refrigerant flows through the tubes 92, the remaining liquid refrigerant absorbs heat from the return air, and in so doing, the remaining liquid refrigerant is vaporized. The air flow across the evaporator heat exchanger 88 is facilitated by the evaporator fan assembly 90. From the tube(s) 92 of the evaporator heat exchanger 88, the refrigerant, in vapor form, may then flow to the accumulator 59 that may be used to prevent the entry of any liquid refrigerant into the compressor 66. The refrigerant, in vapor form, is drawn from the upper part of the suction accumulator through the suction modulation valve 62, and back to the compressor 66.

A thermostatic expansion valve bulb sensor 106 may be located proximate to an outlet of the evaporator tube 92. The bulb sensor 106 is intended to control the thermostatic expansion valve 60, thereby controlling refrigerant superheat at the outlet of the evaporator tube 92. It is further contemplated and understood that the above generally describes a single stage vapor compression system that may be used for many different refrigerants including natural refrigerants such as propane and ammonia. Other refrigerant systems may also be applied that use carbon dioxide (CO2) refrigerant, and that may be a two-stage vapor compression system.

Figure 3:
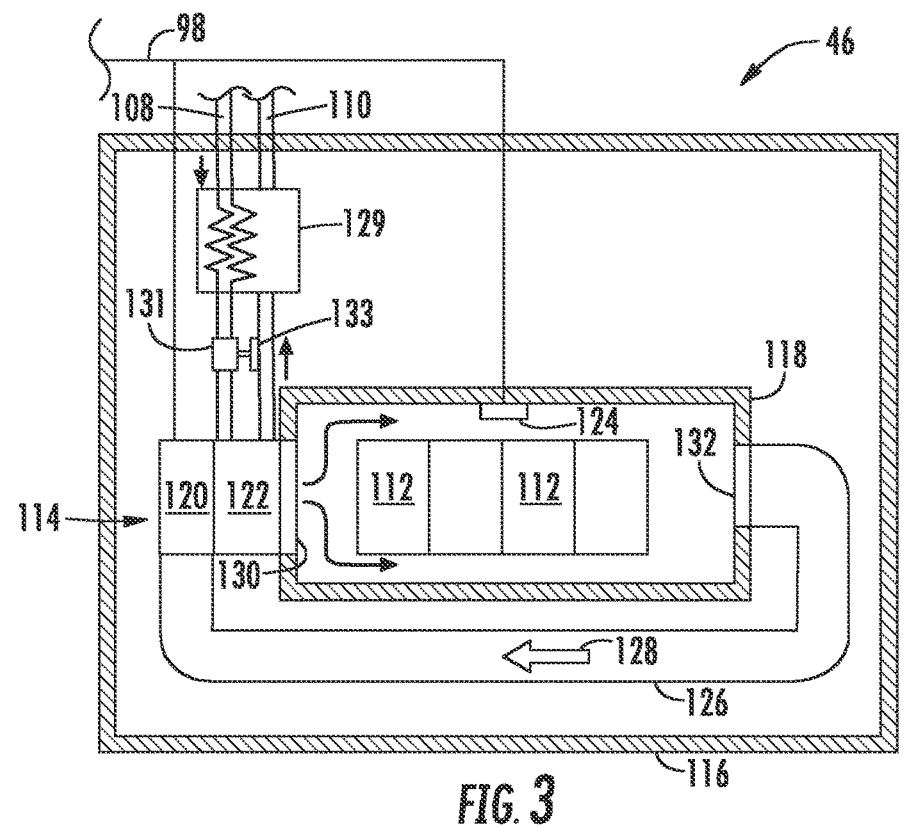
FIG. 3 is a schematic of an energy storage device of the transport refrigeration system.

Referring to FIGS. 2 and 3, the transport refrigeration system 26 may further include supply and return refrigerant tubes 108, 110 each extending between the ESD 46 and the TRU 44. The ESD 46 may include at least one energy storage unit 112 (e.g., battery or bank of batteries), an evaporator subsystem 114, a generally enclosed outer housing 116, and a generally enclosed casing 118. One, or both, of the housing 116 and the casing 118 may be thermally insulated. The batteries 112 may be located in the casing 118. The evaporator subsystem 114 and the casing 118 with the batteries 112 may be located in the housing 116.

The battery cooling, or evaporator, subsystem 114 may include a fan assembly 120, a heat exchanger 122, a temperature sensor 124 that may be located, or exposed to temperatures, in the casing 118, an air duct 126 for the recirculation of air (see arrow 128 in FIG. 3), a refrigerant-to-refrigerant heat exchanger 129, a thermostatic expansion valve 131, and a thermostatic expansion valve bulb sensor 133. The fan assembly 120 is adapted to flow air across the heat exchanger 122 as, for example, commanded by the controller 64 via signal pathway 98 and dictated by temperature data read from the temperature sensor 124. From the heat exchanger 122, the air may flow through an inlet opening 130 communicating through the casing 118, may circulate about the batteries 112, flow out of the casing 118 via an outlet opening 132. From the outlet opening 132, the air 128 may flow through the air duct 126, and back to the fan assembly 120 for recirculation. In general, the batteries may thus be cooled primarily via thermal convection. It is contemplated and understood that the duct 126 may be an integral part of one or both of the housing 116 and the casing 118. For example, the duct walls may be portions of the housing 116 and the casing 118.

The supply refrigerant tube 108 may extend between, and may be in communication with, an outlet of the filter drier 56 and an inlet of the refrigerant-to-refrigerant heat exchanger 129 adapted to increase refrigerant subcooling prior to the evaporator heat exchanger 122 of the evaporator subsystem 114. More specifically, the evaporator subsystem 114 may further include a control valve 135 juxtaposed in a refrigerant line 134 extending between the refrigerant-to-refrigerant heat exchanger 58 and the filter drier 56. The supply refrigerant tube 108 may be attached to the control valve 130 for controlled communication with the refrigerant line 134. The control valve 130 may be controlled by the controller 64 permitting refrigerant flow through the supply refrigerant tube 108 when cooling of the batteries 112 is needed. The return refrigerant tube 110 may extend between, and is in communication with, an outlet of the refrigerant-to-refrigerant heat exchanger 129 of the evaporator subsystem 114 and an inlet of the accumulator 59 (i.e., upstream of the accumulator 59 and downstream of the evaporator tube 92). Although not illustrated, it is contemplated and understood that the ESD 46 may include any variety of other sensors adapted to communicate with the controller 46, or an independent controller. For example, one sensor may measure the amount of energy remaining in the batteries 112.

The transport refrigeration system 26 may be powered solely by the ESD 46 with all of the loads (i.e., motors, controller, valves, etc.) being direct current (DC) loads. Alternatively, the system 26 may include a generator that may be driven by, for example, a combustion engine (not shown). In this example, some of the loads may run on alternating current (AC) power and others on DC power. It is further contemplated and understood that the energy storage units 112 may be fuel cells or other means capable of storing electrical energy.

Figure 4:
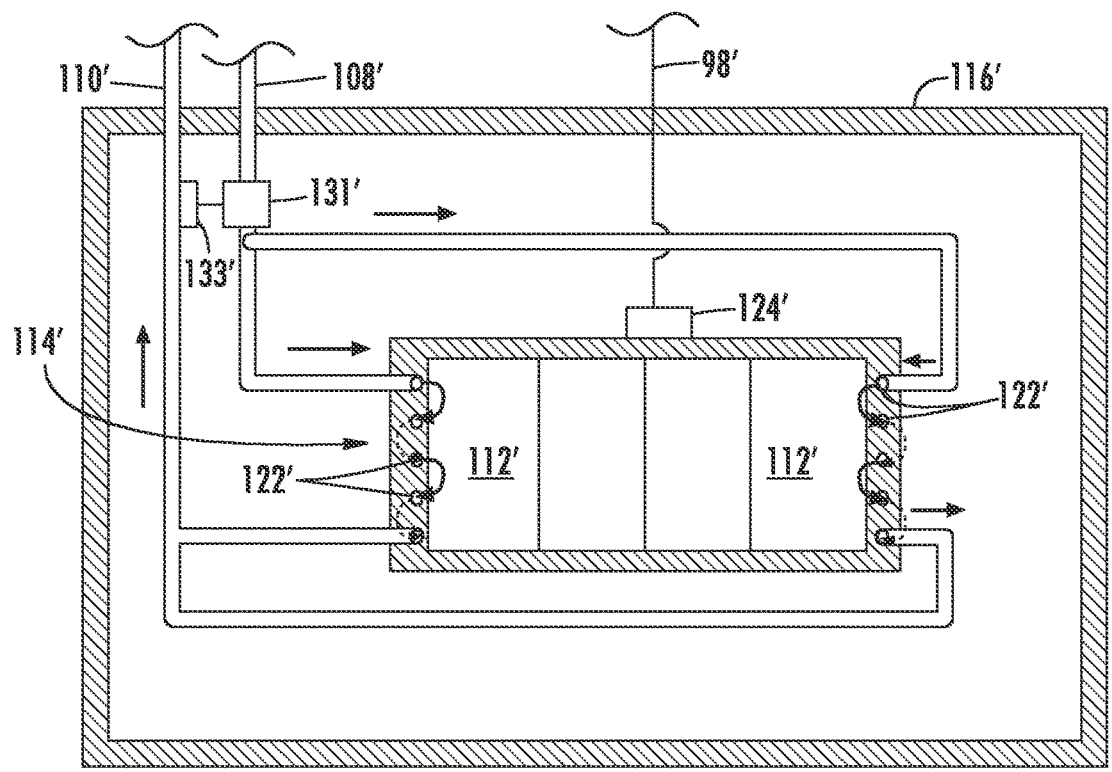
FIG. 4 is a schematic of a second embodiment of an energy storage device.

Referring to FIG. 4, a second embodiment of an ESD is illustrated where like elements to the first embodiment have like identifying numerals except with the addition of a prime symbol suffix. An ESD 46' may include at least one energy storage unit 112', an evaporator subsystem 114', a generally enclosed outer housing 116', and a generally enclosed casing 118'. The housing 116' may be thermally insulated, and the casing 118' may be thermally conductive. The energy storage unit 112' may be located in the casing 118', or the casing may be an integral part of the energy storage unit 112' (e.g., an outer wall of the energy storage unit). The evaporator subsystem 114' and the casing 118' with the energy storage unit 112' may be located in the housing 116'.

Contrary to the first embodiment, the evaporator subsystem 114' may not include a fan assembly and may not require an air duct. Instead, the evaporator subsystem 114' may rely on thermal conduction to cool the energy storage unit 112'. More specifically, the evaporator subsystem 114', may include refrigerant tube(s) 122' as a heat exchanger that is in continuous contact with, and generally wraps about, the casing 118'. Alternatively, the flow tubes 122' may be machined directly into the casing 118'. The casing 118' may be made of any material with a high thermal conductivity coefficient, and may be made, at least in-part, of copper or aluminum.

Benefits of the present disclosure when compared to more traditional systems include lower fuel consumption, and a refrigeration unit that may emit less noise and may be lighter in weight. Furthermore, the present disclosure includes an energy storage device that may be conveniently and efficiently recharged to meet the power demands of the refrigeration unit while meeting combustion engine power and emission requirements that may be enforced by regulatory/government agencies. Yet further, the present disclosure provides a means to cool energy storage units thus extending the life of the units.

While the present disclosure is described with reference to the figures, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A energy storage device for providing electrical energy to a refrigeration unit arranged to cool a container, the refrigeration unit including a condenser and an evaporator configured to cool air entering the container, the energy storage device comprising:
    a casing;
    a battery disposed in the casing; and
    an evaporator subsystem including:
    a supply refrigerant tube configured to supply refrigerant from downstream of the condenser of the refrigeration unit;
    an expansion device arranged to receive condensed refrigerant from the supply refrigerant tube;
    a heat exchanger arranged to receive and evaporate refrigerant from the expansion device;
    a return refrigerant tube configured to return refrigerant from the heat exchanger to downstream of the evaporator of the refrigeration unit;
    wherein the evaporator subsystem includes an evaporator fan assembly constructed and arranged to flow air through the heat exchanger and into the casing about the battery.

2. The energy storage device set forth in claim 1, further comprising:
    a housing adapted to enclose the casing and the evaporator subsystem, wherein the housing is thermally insulated.

3. A energy storage device for providing electrical energy to a refrigeration unit arranged to cool a container, the refrigeration unit including a condenser and an evaporator configured to cool air entering the container, the energy storage device comprising:
    a casing;
    a battery disposed in the casing; and
    an evaporator subsystem including:
    a supply refrigerant tube configured to supply refrigerant from downstream of the condenser of the refrigeration unit;
    an expansion device arranged to receive condensed refrigerant from the supply refrigerant tube;
    a heat exchanger arranged to receive and evaporate refrigerant from the expansion device;
    a return refrigerant tube configured to return refrigerant from the heat exchanger to downstream of the evaporator of the refrigeration unit;
    wherein the heat exchanger is a tube wrapped about, and in direct contact with, the casing for conductive heat transfer.

* * * * *